(12) United States Patent
Fulbrook et al.

(10) Patent No.: US 8,042,491 B2
(45) Date of Patent: Oct. 25, 2011

(54) WEEDLESS FISH STRUCTURE

(76) Inventors: David Joseph Fulbrook, Fairfax, VA (US); Jason D. Fulbrook, Fairfax, VA (US); Jim Edward Fulbrook, Fairfax, VA (US)

(*) Notice: Subject to any disclaimer, the term of this patent is extended or adjusted under 35 U.S.C. 154(b) by 0 days.

(21) Appl. No.: 11/580,121

(22) Filed: Oct. 13, 2006

(65) Prior Publication Data
US 2008/0087227 A1 Apr. 17, 2008

(51) Int. Cl.
*A01K 61/00* (2006.01)
*A01K 97/00* (2006.01)

(52) U.S. Cl. .............. 119/219; 119/223; 43/4

(58) Field of Classification Search .......... 119/215, 119/219, 221, 223, 269; 43/1, 2, 4, 4.5; 405/21, 405/23, 24
See application file for complete search history.

(56) References Cited

U.S. PATENT DOCUMENTS

| | | | | |
|---|---|---|---|---|
| 3,186,120 A * | 6/1965 | Layson | | 43/2 |
| 4,490,071 A * | 12/1984 | Morrisroe | | 405/24 |
| 4,534,675 A * | 8/1985 | Morrisroe | | 405/24 |
| 4,550,518 A * | 11/1985 | Layson | | 43/2 |
| 4,672,764 A * | 6/1987 | Dempsey | | 43/4 |
| 4,727,672 A * | 3/1988 | Hill et al. | | 43/4 |
| 5,315,779 A * | 5/1994 | Fussell | | 43/4 |
| 5,906,067 A * | 5/1999 | Layson | | 43/2 |
| 6,171,686 B1 * | 1/2001 | McNeil | | 428/304.4 |
| 6,230,654 B1 * | 5/2001 | McNeil | | 119/256 |
| 6,269,582 B1 * | 8/2001 | Feld | | 43/4 |
| 6,978,735 B1 * | 12/2005 | Yeager | | 119/221 |
| 7,134,235 B2 * | 11/2006 | Gifford | | 43/4 |
| 7,512,326 B1 * | 3/2009 | Eldredge et al. | | 396/25 |
| 2002/0040684 A1 * | 4/2002 | McNeil | | 119/223 |
| 2002/0095850 A1 * | 7/2002 | Jones | | 43/4 |
| 2011/0067642 A1 * | 3/2011 | Ewald | | 119/221 |

* cited by examiner

*Primary Examiner* — Kimberly Smith
(74) *Attorney, Agent, or Firm* — John Richardson

(57) ABSTRACT

The Weedless Fish Structure is a simple, waterproof, hardened acrylic structure that is submerged in water to provide camouflage and shade cover for game and feeder fish in areas where the body of water does not provide adequate cover. The weights within the main tube allow the apparatus to rest on the bottom with little buoyancy. A small air tube edges around the semi-circular bifurcated shade fin and provides buoyancy to the top fin so it remains upright. Two stakes are provided to secure the apparatus to the bottom when desired to prevent currents from moving the device. If the structure is turned over to where the long tube is above the shade fin, the weights will slide down into the shade fin tube and the air will rise into the long main tube, and then by attaching two floats, the structure becomes a surface apparatus. A photo image of underwater vegetation, sandwiched between the acrylic sides of the shade fin provides additional concealment for fish and a more natural appearance to attract fish to hide on either side of the shade fin in sunny or shaded conditions.

9 Claims, 1 Drawing Sheet

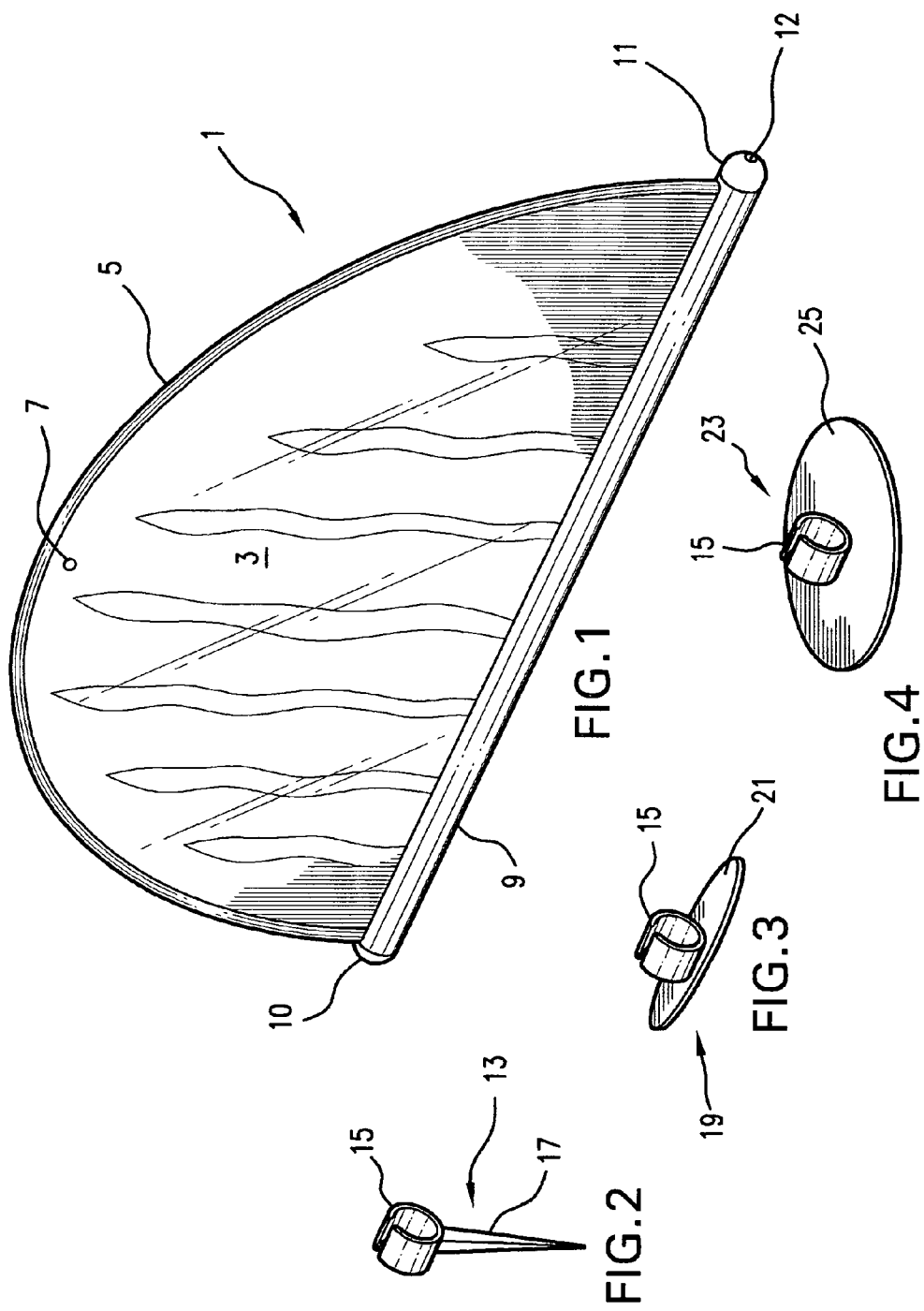

WEEDLESS FISH STRUCTURE

BACKGROUND OF THE INVENTION

1. Field of the Invention

The present invention is directed to a device to provide a shaded area for game fish. It is an accepted fact that game fish and feeder fish are both attracted to underwater structures for foraging and for cover. Structures can be natural to include growing underwater vegetation, parts of fallen trees, large rocks and man-made features such as docks and other sunken objects. In sunlight conditions, feeder fish will recognize and forage or hide on the shaded side of a structure to avoid detection and capture; predatory fish will also hide in shaded areas to lay in wait to capture a feeder fish or other food source. In theory then, any man-made structure that creates a favorable location that attracts game fish when foraging would provide an advantage to fishermen for enticing and catching fish when casting artificial lures or live bait on either side of the known structure. A fish structure will also attract fish when the sun is not out or in evening hours because it appears to provide cover and concealment. Furthermore, if the structure had a natural vegetation appearance to it provided by a photographic image of vegetation, the apparatus would have an enhanced function as a natural attractant any time it is in place in the water and visible to the fish.

By the observation of the inventors and by frequent demonstrations and mention on sport fishing television shows and print media, it is a recognized fact that fish are attracted to contrast differences in their surroundings. Many game fish routinely stake out hunting territory around underwater structure, especially by waiting in shaded areas during daylight hours. In some fishing spots, the bottom is relatively free of structure and so the fishing in those areas is often lacking because fish do not have a place to forage or hide. The purpose of this invention is to provide structure and cover, especially when the sun casts a shadow that covers a game fish if it swims up to the structure to sit in wait to capture feeder fish.

The structure is described as "Weedless" because this is a common usage term used by fishing enthusiasts to describe any type of apparatus or condition that reduces the likelihood that fishing hooks will snag onto objects that the hooks pass over or against when the lure or bait is being retrieved by the fisherman.

Typically when fishermen use exposed hooks and one or more hooks drag (come in contact) over an object, it will become snagged on the object, which interferes with the effective presentation of the lure or bait. Snags are a real annoyance for fishermen. The smooth, thin and flat surfaces and rounded edges of the fish structure will allow most fishing lures and hooks to pass over the structure rather than become snagged onto it. Hence, the Weedless attribute as a claim and innovative feature applies to these embodiments.

2. Description of the Prior Art

U.S. Pat. No. 4,916,845 to Aydelette discloses a bait container under horizontally oriented members to provide areas for fish to assemble.

U.S. Pat. No. 4,727,672 to Hill et al. discloses a ballasted and anchored structure that is constructed of a plurality of simulated fronds. It is inclusive of materials to bait the fish in the area by smell.

U.S. Pat. No. 6,269,582 to Feld discloses a fish lure in the shape of floating panels with simulated sea weed which may be anchored or towed.

U.S. Pat. No. 5,315,779 to Fussel discloses an anchored assembly of horizontally oriented plates to provide shade and to thereby attract fish.

U.S. Pat. No. 5,235,774 to Burghoff discloses a tethered bait supply to attract fish.

U.S. Pat. No. 5,117,577 to Burghoff discloses a tethered bait supply with line guide to attract and catch fish.

U.S. Pat. No. 4,672,764 to Dempsey discloses a floating ring supporting an opaque sheet to provide shade for fish and to attract them thereto.

U.S. Pat. No. 2,810,229 to Allyn discloses a vertically oriented restraining sheet or net to prevent unwanted fish migration from one area to another.

3. Objectives of the Invention

This invention is to attract fish to a known area so that a fisherman may make his casts with some degree of confidence that fish will be in that area. It does this by providing shade in the water for the larger game fish, the predators, to hide with little effort to thereby reduce the currents, eddies and water born vibrations that betray their presence to game fish.

SUMMARY OF THE INVENTION

Though made of an acrylic, the "Fish Structure" has an opaque layer associated with a semi-circular fin. It may be configured to float and be anchored with the shade fin depending downward into the body of water. It may also be configured to be anchored to the lake/stream/bay/harbor/ocean bottom with the shade fin extending toward the surface. These allow the fisherman to orient the "Fish Structure" to provide shade in a particular area and to know which side will be shady. In this manner the fisherman may anticipate the location of the game fish in accord with the position of the sun and make his casts accordingly.

BRIEF DESCRIPTION OF THE DRAWINGS

FIG. 1 shows the fish structure with the shade fin upward.

FIG. 2 shows a bottom engaging spike which is to be used in pairs and are to placed upon the fish structure longitudinal tube, extending downwardly, and will engage a soft bottom for retaining proper orientation.

FIG. 3 shows an external weight which may be used to anchor the fish structure yet allow movement with currents to appear more realistic to fish.

FIG. 4 shows a buoyant float which may be used upon the main longitudinal tube, again in pairs, or more, to allow the fish structure to hang from the surface.

DESCRIPTION OF THE PREFERRED EMBODIMENT

The structure 1 will be composed of acrylic materials (Plexiglas or similar polymer) that have a long-term resistance to water erosion or breakdown. Every surface on the apparatus will be smoothed, polished, or curved so that the structure poses a minimal risk for hook snagging when the fisherman casts lures to pass over and around the structure. The term used by fishermen to describe a structure that does not snag easily is "weedless." Hence, the structure will be weedless in effect.

The acrylic structure can vary in size ranging from approximately 15-30 inches in length by approximately 12-20 inches in height. However, the appearance and relative dimensions of the structure 1 will be the same for any size variations. There are two primary components of the basic structure: a shade fin 3 attached to a straight, long tube 9. The shade fin 3 is composed of a 180 degree semi-circle with a one-to-two inch section included between the semi-circular fin 3 and the long tube 9 to add height. The shade fin 3 may be composed of two sheets of ⅛ inch clear acrylic material.

A waterproof photograph, not shown, (plasticized or acetate non-transparency of about 100-250 microns in thickness) of a scene of plant (vegetative) material will be installed (positioned) in between the two acrylic sheets of the shade fin 3. The photograph will have the same vegetation image printed on each side with a solid color background.

The shade fin has a hollow tube rim 5 of about 0.25 inch (O.D.) affixed along and around the outer edge of the shade fin 3. The tube 5 along the shade fin 3 will provide a smooth surface to achieve the weedless effect. The shade fin tube 5 is connected to the long tube 9 so that the inside can be filled with a measured amount of water, lead buckshot weights (small, round, metallic pellets more dense than water), not shown, and air. The interior of the shade fin tube 5 will be continuous with the interior of the long tube 9 so that a circulating flow can be achieved with the materials inside the enclosed tubes.

Once inside the sealed tubes, the water, buckshot and air can readily flow from the shade fin tube 5 to the long tube 9 based on which component is held upright above the other. If the shade fin 3 is held upright above the long tube 9, the air will go to the top of the shade fin tube 5 and the weight pellets will go to the bottom into the long tube 9. Conversely, if the long tube is held upright above the shade fin, the air will partially fill the long tube 9 and the weights will descend into the shade fin tube 5. The water, weights and air will be poured into the tube system and adjusted when the apparatus is manufactured so that the structure remains generally suspended in the water when submerged.

The acrylic long tube 9 component is composed of a sealed cabochon cap 11 on one end and a cabochon cap 10 on the other end, except that the cap on one end 11 will have a threaded hole to the inside with a flathead screw 12 that can be used to seal the tube contents. The approximate one-half inch diameter screw will have a rounded head that will be flush with the cap when it is screwed down. The threaded hole will allow the metallic weights (buckshot pellets), water, and air to be added into the tube system, which can then be sealed by the screw 12.

The length of the long tube will be between 15-30 inches. The long tube 9 will have an outer diameter of approximately 0.75-1.25 inches. The long tube will be between ¹⁄₁₆ and ⅛ inch thick. The shade fin tube 5 will have an inner diameter of about 0.125 inch. The thickness of the tube will be about ¹⁄₁₆ inch, so the outer diameter will be about 0.25 inch.

The buckshot pellets inside the sealed tubes will weigh the structure down to make it heavier than the water and not buoyant, but the air inside the tube will balance out the weight so the structure 1 is suspended in water when immersed. The intention is that the structure will be capable of some undulation due to water currents in a way that emulates submerged vegetation as it naturally undulates back and forth in the water.

A small circular eyelet 7 (about 0.125-0.25 inch in diameter) will be placed near the top and center of the shade fin 3 and about 0.50 inches in from the outer edge of the shade fin 3. The eyelet provides an attachment point where a line can be optionally attached to the apparatus with a float device going to the surface so the submerged structure on the bottom can be easily located and retrieved when desired by the fisherman. If the apparatus is used as a floating structure, then a small weight can be optionally attached by a line through the eyelet 7 to anchor the structure in a relatively fixed position in the water.

All of the materials are water resistant so that the structure can be placed in the water and left there for years if desired. Over time the submerged structure will accumulate some algae and appear more natural and the algae will attract small feeder fish. Game fish are known to be territorial and over time will come to recognize and frequent territorial spots where shade and underwater structure provide a camouflage cover to catch prey more easily. The structure will also be made of strong enough material as to be relatively unbreakable if stepped on by a normal-sized man when it is stored or transported on land before submersion.

There are three embodiments (configurations or variants) of the weedless fish structure 1 that may be placed in the water to attract fish by adding one of three pairs of attachments as described below. If no attachments are installed and the apparatus is immersed in water, the structure 1 would be suspended in the water rather than float or immediately sink to the bottom. Each embodiment has C-shaped rings 15 with beveled edges on one end that slide over the long tube 9 of the apparatus to secure the embodiment in place. Each embodiment comes as two identical (single elements shown) slide-on attachments. In other words, to configure the apparatus as intended, the user should slide on the attachment pair on each end of the long tube before placing the structure in the water in the desired location as the desired variant (bottom, fixed, or surface).

Embodiment 1 is called "bottom weights," which involves sliding two relatively flat football-shaped weights 19 onto the long tube 9 of the apparatus so the fisherman can drop or place the structure 1 into the water where it will sink and fin 3 will remain upright. The shade fin 3 will remain upright because it will have some amount of buoyancy due to an amount of air that will rise into the tube 5 surrounding the shade fin 3 when it is held upright. While upright on the bottom, this configuration (embodiment) is then free to undulate back and forth with the current of the water. When the weights are installed, the long part 21 of the weights will be parallel and underneath the long tube, so these attachments will also be weedless.

Embodiment 2 is called the "fixed structure." It is composed of two 3.5 inch long stakes 13 that are slid onto the long tube 9 of the apparatus so the fisherman can directly position and secure the structure 1 to the bottom in a desired location and orientation to attract game fish. This configuration (embodiment) is useful when the current of the water may be strong enough to move the structure 1 or when a fixed orientation without undulation is desired. Both the bottom weights 19 and stakes 13 can be attached to the structure at the same time to add weight to the fixed structure to further secure it to the bottom, if desired by the user.

Embodiment 3 is called the "surface structure," which involves the attachment of two relatively flat, oval-shaped and green colored flotation devices 23 that would keep the weedless fish structure afloat when it is placed into the water. When the shade fin 3 is held downward, the air in the tubes will rise into the long tube to add buoyancy for the apparatus to float and the weight pellets would slide down into the shade fin tube 5. In this situation, the shade fin 3 would be directed downward in the water and would be free to undulate with the movement of the water. A weight may be secured to the shade fin 3 to anchor the structure 1 by use of a cord through aperture 7 in the shade fin 3. The flotation devices 23 will also act as markers for aid in retrieval.

Each of the attachment embodiments will have curved edges and smoothed, flat profiles to retain the weedless functionality. Because each attachment has a simple C-shaped ring 15, each component can be quickly slid on or off the longitudinal tube 9 to reconfigure the structure with little effort. The concept is so simple that only a few easy instructions for use will be required. Summary: The three embodiments allow the weedless fish structure 1 to be quickly and easily configured to be used as a bottom or surface weedless structure as desired by the fisherman.

Though two shad fins 3 with an opaque picture, has been set forth above, a single shade fin 3 may be provided with and an opaque surface with coloration to simulate underwater flora. Likewise it is held to be similarly apparent that the shade fin itself may be made from an opaque and colored acrylic, or other known plastic, and be provided with surface coloration to simulate underwater flora.

It is apparent from the drawings and the description that the shade fins 3 are essentially planar. This is not intended nor required. The shade fins may be somewhat curved or convoluted in such a manner to add dimension to any floral or fauna simulation between or upon the fin.

Once the structure is in the water, the vegetation image and the shadow cast by the semi-circular shade fin 3 will attract both predatory game fish and small feeder fish. Because the fisherman knows the orientation and location of the structure on the bottom from when it was placed into the water, he can position himself from a boat or from the shoreline to cast his fishing lures or bait so that it passes along either side of the structure. If a game fish is hiding on either side of the structure they can lunge out at the lure when it passes by. If the weedless fish structure is used as a surface apparatus, the location and orientation of the apparatus will be obvious.

We claim:

1. A waterborne shade producing structure comprising a shade fin depending from a main tube, oriented along said main tube, while bordered by a smaller tube, the smaller tube attached to a periphery of said fin and said main tube, the fin further presenting an opaque surface in order to cast a shadow within the water, said main tube and said small tube having interiors in communication with the other, both said tubes having within said interiors a mixture of ballast members, water and air in order to control relative buoyancy where said fin is two plastic essentially planar members, side by side, and an opaque picture is there between.

2. The shade producing structure of claim 1 where said main tube is mechanically sealed permitting adjustment of said mixture by opening said mechanical seal.

3. The shade producing structure of claim 1 where stake members are attachable to said main tube in order to affix said structure to a bottom surface of a body of water.

4. The shade producing structure of claim 1 where weight members are attachable to said main tube to anchor said structure to a bottom surface of a body of water yet permit water currents to cause said structure to move therewith.

5. The shade producing structure of claim 1 where flotation members are attachable to said main tube to provide for flotation of said structure.

6. The shade producing structure of claim 1 where said shade fin is provided with an aperture to permit a cord attachment of one of a marker float and an anchor.

7. A waterborne shade producing structure comprising a shade fin depending from a main tube, oriented along said main tube, while bordered by a smaller tube, the smaller tube attached to a periphery of said fin and said main tube, the fin further presenting an opaque surface in order to cast a shadow within the water, said main tube and said small tube having interiors in communication with the other, both said tubes having within said interiors a mixture of ballast members, water and air in order to control relative buoyancy where said fin is a single member with an opaque coloration thereupon.

8. The shade producing structure of claim 7 where said fin is a single member of an opaque and colored material.

9. A waterborne shade producing structure comprising a shade fin depending from a main tube, said shade fin integrally affixed to said main tube and oriented along said main tube, said shade fin defining a border which is, in turn, bordered by a smaller tube, the smaller tube integrally attached to said border and extending along the entire border of said fin and to said main tube, the fin further presenting an opaque surface in order to cast a shadow within the water, said main tube and said small tube having interiors in communication with the other, both said tubes having within said interiors a mixture of ballast members, water and air in order to control relative buoyancy, and the shade structure is secured to the seabed floor by means of stakes attached to the main tube.

* * * * *